United States Patent [19]

Toshimitu

[11] 4,386,298
[45] May 31, 1983

[54] BRUSHLESS DC MOTOR CONTROL CIRCUIT

[75] Inventor: Manabu Toshimitu, Tsurugashima, Japan

[73] Assignee: Pioneer Electronic Corporation, Tokyo, Japan

[21] Appl. No.: 251,824

[22] Filed: Apr. 7, 1981

[30] Foreign Application Priority Data

Apr. 14, 1980 [JP] Japan ............................. 55-50325[U]
Apr. 30, 1980 [JP] Japan ............................. 55-59147[U]
May 20, 1980 [JP] Japan ............................. 55-69300[U]

[51] Int. Cl.³ .......................................... H02K 29/00
[52] U.S. Cl. ................................... 318/254; 318/138
[58] Field of Search .................... 318/138, 254, 254 A

[56] References Cited

U.S. PATENT DOCUMENTS 3,783,359 1/1974 Malkiel ............................... 318/254
4,066,935 1/1978 Takaoka et al. ..................... 318/138
4,258,299 3/1981 Takeda et al. ...................... 318/258

Primary Examiner—David Smith, Jr.
Assistant Examiner—Saul M. Bergmann
Attorney, Agent, or Firm—Griffin, Branigan & Butler

[57] ABSTRACT

A brushless dc motor control circuit for driving and controlling a brushless dc motor having a magnetized rotor, a plurality of drive coils disposed in the vicinity of the magnetized rotor and a plurality of magneto-sensitive elements responsive to a magnetic field generated by the rotor, which comprises coil drive means for energizing the drive coils in accordance with changes of the electric characteristics of the magneto-sensitive elements, and bias supply means for supplying bias currents to the respective magneto-sensitive elements. The bias supply means changes the flow direction of the bias currents for a short period when the dc motor is to be stopped thereby to apply a brake torque to the magnetized rotor to perform a quick stop of the dc motor.

10 Claims, 24 Drawing Figures

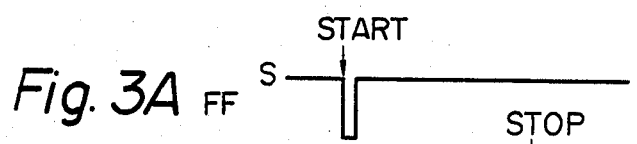
Fig. 3A FF S
Fig. 3B R
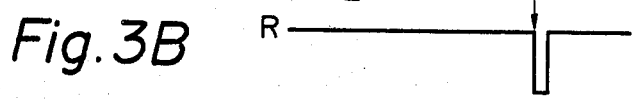
Fig. 3C FF $\bar{Q}$
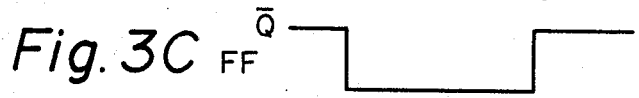
Fig. 3D Q
Fig. 3E MM $\bar{Q}$
Fig. 3F Q
Fig. 3G POW SW
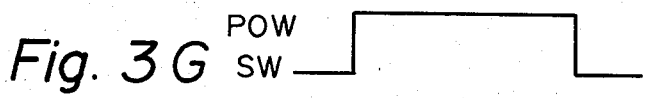
Fig. 3H
Fig. 3J
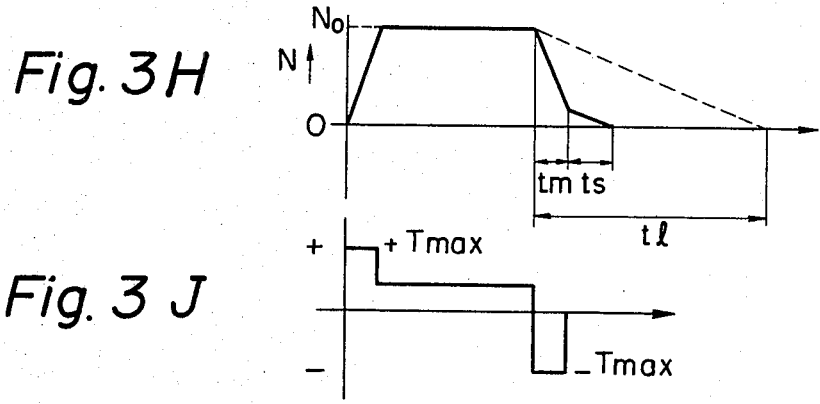

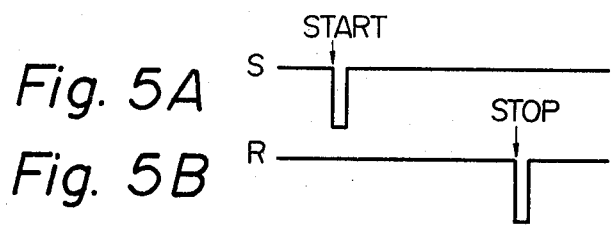
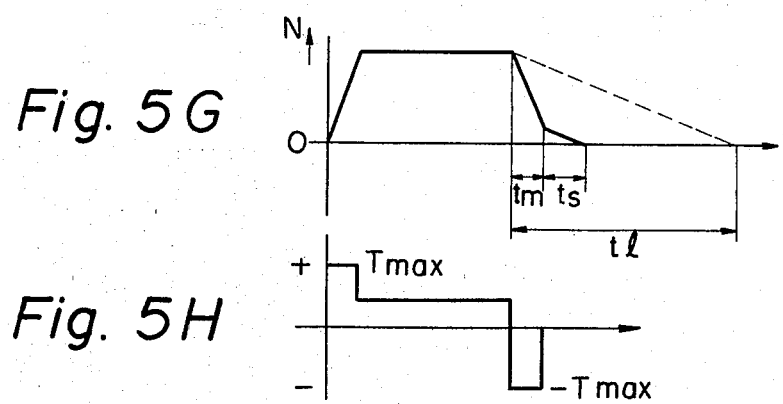

BRUSHLESS DC MOTOR CONTROL CIRCUIT

FIELD OF THE INVENTION

The present invention relates to a circuit for driving and controlling a brushless dc motor.

BACKGROUND OF THE INVENTION

A brushless dc motor is a dc motor which dispenses with any brush and commutator but uses a plurality of magneto-sensitive elements for detection of the angular position of a magnetized rotor thereof. Hall effect elements are advantageously used as those magneto-sensitive elements.

Such a brushless dc motor is, for example, utilized for driving a magnetic recording disc in a magnetic disc recorder, which disc has usually a large mass and is to be rotated at a high speed. In such a case, rapid stopping of the brushless dc motor cannot be readily performed by merely ceasing the supply of electric power thereto. Thus, it is usual to employ frictional braking and/or dynamic braking in order to perform a quick stopping of the brushless dc motor especially when the brushless dc motor is subjected to a load with a large mass and/or a high rotational speed.

In case frictional braking is used, it is a problem that a brake shoe for the frictional braking has a relatively short life time and produces unwanted frictional heat. Furthermore, the frictional braking system is subject to leakage of brake oil which may adversely affect other elements around the braking system.

On the other hand, the dynamic braking does not produce a sufficiently large brake torque at a low rotational speed of the dc motor since the magnitude of the brake torque resulting from the dynamic braking is proportional to the rotational speed of the motor.

Another type of braking is known in the art, in which a reverse current is applied to the brushless dc motor so as to perform braking by reverse torque caused by the reverse current. However, a complicated sensing circuit is required for detecting the rotational direction of the motor so as to know the polarity of the reverse current to be applied to the motor.

It is accordingly a primary object of the present invention to provide an improved brushless dc motor drive and control circuit which can perform quick stoppage of the motor.

It is another object of the present invention to provide an improved brushless dc motor drive and control circuit which is simple in construction and accordingly economical.

SUMMARY OF THE INVENTION

With a view to achieving the objects mentioned above, there is provided a brushless dc motor control circuit for driving and controlling a brushless dc motor including a magnetized rotor, a plurality of drive coils disposed in the vicinity of said magnetized rotor and a plurality of magneto-sensitive elements respectively having electric characteristics responsive to changes in the magnetic field generated by the magnetized rotor, which comprises: a bistable circuit having two stable states, the bistable circuit being adapted to assume one of the two stable states when triggered by a start indication signal and to assume the other state when triggered by a stop indication signal; a pulse generator connected to the bistable circuit, for producing a braking pulse with a predetermined pulse width when the bistable circuit changes its state from the one state to the other state; a bias current supply circuit for supplying bias currents to the magneto-sensitive elements in a normal direction in the absence of the braking pulse and in a reverse direction in the presence of the braking pulse; a drive signal generating circuit for producing a drive signal when the bistable circuit assumed the one state or when the braking pulse is present; a power supply circuit for energizing the drive coils in a certain sequence in accordance with the changes of the electric characteristics of the magneto-sensitive elements when receiving the drive signal, whereby the magnetized rotor rotates.

BRIEF DESCRIPTION OF THE DRAWINGS

The features and the advantages of a brushless dc motor control circuit according to the present invention will be more clearly understood from the following description taken in conjunction with the accompanying drawings in which like reference numerals designate similar or corresponding components and in which:

FIGS. 3A through 3G are diagrams respectively showing waveforms of signals appearing in the brushless dc motor control circuit of FIG. 1;

FIGS. 3H and 3J are diagrams respectively showing variations in the rotational speed and rotational torque of the brushless dc motor controlled by the control circuit of FIG. 1;

FIGS. 5A through 5F are diagrams respectively showing waveforms of signals appearing in the control circuit of FIG. 4;

FIGS. 5G and 5H are diagrams respectively showing variations of the rotational speed and the rotational torque of the brushless dc motor controlled by the control circuit of FIG. 4.

DETAILED DESCRIPTION OF THE EMBODIMENTS

Figure 1:
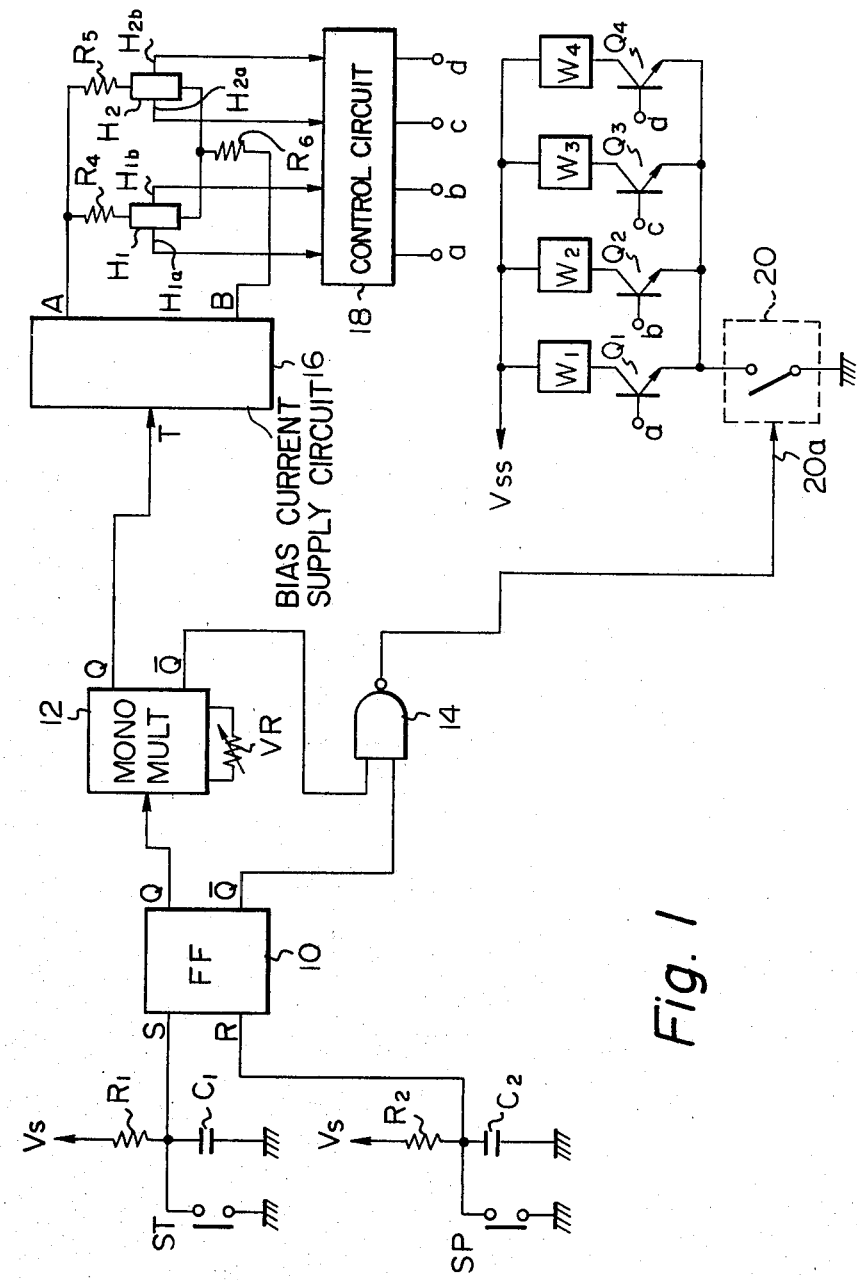
FIG. 1 is a circuit diagram showing a brushless dc motor control circuit according to the present invention.

Referring to the drawings, and more specifically to FIG. 1, there is shown a brushless dc motor control circuit according to the invention which comprises start and stop switches ST and SP. Those switches ST and SP are normally-open and are actuated to close either manually or by means of suitable actuators (not shown). When start of the brushless dc motor is desired, the start switch ST is actuated to close its circuit so that a capacitor $C_1$ is bypassed by the start switch ST. When, on the other hand, stoppage of the dc motor is required, the stop switch SP is actuated to close its circuit so that a capacitor $C_2$ is bypassed. The capacitors $C_1$ and $C_2$ are respectively impressed upon with a source voltage $V_s$ through resistors $R_1$ and $R_2$. A junction between the resistor $R_1$ and the capacitor $C_1$ is connected to a set terminal of a flip-flop circuit 10. A reset terminal of the flip-flop circuit 10 is connected to a junction between the resistor $R_2$ and the capacitor $C_2$. It is now to be noted that the capacitor $C_2$ has a much larger capacitance than the capacitor $C_1$ so that the flip-flop circuit 10 is reset at every time when the source voltage $V_s$ is applied. The flip-flop circuit 10 has output terminals Q and $\overline{Q}$ respectively connected to a trigger terminal of a monostable multivibrator 12 and one of input terminals of a NAND gate 14. The other input of the NAND gate 14 is connected to the $\overline{Q}$ output terminal of the flip-flop circuit 10. The monostable multivibrator 12 is adapted to take a quasi-stable state of a time period which can be regulated by changing the resistance of an adjustable resistor VR thereof. The monostable multivibrator 12 produces "L" and "H" logic signals on its Q and $\overline{Q}$ output terminals, respectively, when it is in its stable state, but it produces "H" and "L" signals on its Q and $\overline{Q}$ terminals, respectively when it is in its quasi-stable state. The Q output terminal of the monostable multivibrator 12 is connected to a trigger terminal T of a bias current supply circuit 16. When an "H" logic signal is applied to the trigger terminal T of the bias current supply circuit 16, the bias current supply circuit 16 causes a bias current to flow from an output terminal A thereof through resistors $R_4$, $R_5$, a pair of Hall effect elements $H_1$, $H_2$ and a resistor $R_6$ to an output terminal B thereof. When, on the other hand an "L" logic signal is applied to the trigger terminal T of the bias current supply circuit 16, the bias current supply circuit 16 causes a bias current to reversely flow from the output terminal B to the output terminal A. The Hall effect element $H_1$ has a pair of output terminals $H_{1a}$ and $H_{1b}$ and the Hall effect element $H_2$ also has a pair of output terminal $H_{2a}$ and $H_{2b}$. The Hall effect elements $H_1$ and $H_2$ respectively produce output signals inverse in phase to each other on their pairs of output terminals $H_{1a}$, $H_{1b}$ and $H_{2a}$, $H_{2b}$ in accordance with the angular position of a magnetized rotor (not shown) of the brushless dc motor since the Hall effect elements $H_1$ and $H_2$ are positioned in the vicinity of the magnetized rotor and are subjected to a magnetic field generated by the magnetized rotor. The output terminals $H_{1a}$, $H_{1b}$ and $H_{2a}$, $H_{2b}$ are respectively connected to input terminals of a control circuit 18 which have output terminals a, b, c and d respectively connected to base terminals of transistors $Q_1$, $Q_2$, $Q_3$ and $Q_4$. The control circuit 18 produces on its output terminals a, b, c and d four output signals respectively having waveforms corresponding to the output signals from the output terminals $H_{1a}$, $H_{1b}$ and $H_{2a}$, $H_{2b}$ of the Hall effect elements $H_1$ and $H_2$. The four output signals from the output terminals a, b, c and d are respectively applied to base terminals of the transistors $Q_1$, through $Q_4$. The control circuit 18 may include four amplifiers having input terminals thereof respectively connected to the output terminals $H_{1a}$ through $H_{2b}$ of the Hall effect elements $H_1$ and $H_2$ and output terminals thereof respectively connected to the output terminals a, b, c and d. Collector terminals of the transistors $Q_1$ through $Q_4$ are respectively connected to end terminals of drive coils $W_1$, $W_2$, $W_3$ and $W_4$ which are disposed around the magnetized rotor. A voltage source $V_{ss}$ is connected to the remaining terminals of the drive coils $W_1$ through $W_4$. A power switch 20 is interposed between the emitter terminals of the transistor $Q_1$ through $Q_4$ and the ground so that the drive coils $W_1$ through $W_4$ are energized in sequence in accordane with the sequential conduction of the transistors $Q_1$ through $Q_4$ when the power switch 20 is closed. The power switch 20 has a trigger terminal 20a through which it receives a trigger pulse of a logic signal to actuate to close its circuit. The trigger terminal 20a is connected to an output terminal of the NAND gate 14.

Figure 2:
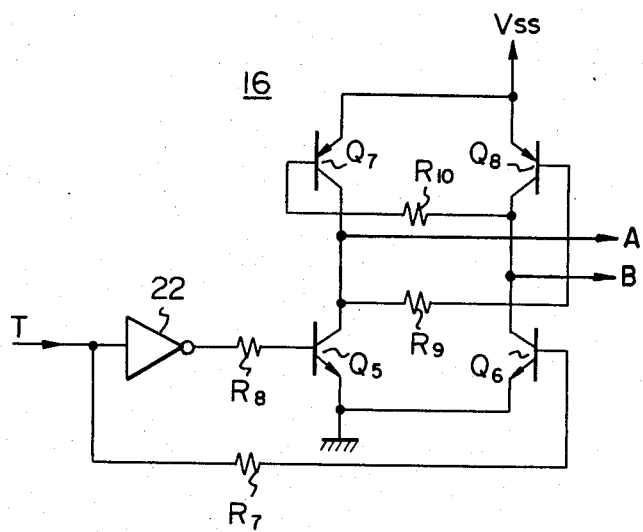
FIG. 2 is a circuit diagram showing a circuit arrangement of a part in the brushless dc motor control circuit of FIG. 1.

In FIG. 2, there is shown a preferred circuit arrangement of the bias current supply circuit 16, which includes a pair of NPN transistors $Q_5$ and $Q_6$ and a pair of PNP transistors $Q_7$ and $Q_8$. The emitter terminals of the transistors $Q_5$ and $Q_6$ are grounded. The base terminals of the transistors $Q_5$ and $Q_6$ are connected to the trigger terminal T through an inverter 22 and a resistor $R_8$ and a resistor $R_7$, respectively. The collector terminals of the transistors $Q_5$ and $Q_6$ are respectively connected to the collector terminals of the transistors $Q_7$ and $Q_8$. The base terminals of the transistors $Q_7$ and $Q_8$ are connected through resistors $R_{10}$ and $R_9$ to the collector terminals of the transistors $Q_6$ and $Q_5$, respectively. The collector terminals of the transistors $Q_7$ and $Q_8$ are further connected to the output terminals A and B, respectively. The emitter terminals of the transistors $Q_7$ and $Q_8$ are connected to the voltage source $V_{ss}$.

When, in operation, a logic "H" signal is applied to the trigger terminal T, the transistor $Q_5$ becomes non-conductive and the transistor $Q_6$ on the other hand, becomes conductive so that the transistor $Q_7$ becomes conductive but the transistor $Q_8$ becomes non-conductive, whereby a bias current flows from the terminal A to the terminal B. When, on the contrary, a logic "L" signal is applied to the trigger terminal T, the transistors $Q_5$ and $Q_8$ become conductive so that a bias current flows from the output terminal B to the output terminal A.

It is, in this instance, to be noted that the bias current supply circuit of FIG. 2 is advantageous in that it can produce a sufficient magnitude of bias current and operate stably. It is easy to change the magnitude of the bias current over a wide range by properly selecting characteristics of the elements of the circuit of FIG. 2. The advantages of the bias current circuit of FIG. 2 may be more clearly understood if one refers to such a prior art circuit as disclosed in Japanese Utility Model Publication No. 54-9.

Referring to FIGS. 3A through 3J the operation of the control circuit mentioned above will be explained hereinbelow in more detail.

When the source voltage $V_s$ is applied, the flip-flop circuit 10 is reset so as to produce "L" and "H" logic signals on its Q and $\overline{Q}$ output terminals respectively. In this instance, the monostable-multivibrator 12 produces an "H" logic signal on its $\overline{Q}$ terminal, so that the NAND gate 14 produces an "L" logic signal and the power switch 20 is OFF. Accordingly, no current flow through the drive coils $W_1$ through $W_4$ and no torque is applied to the magnetized rotor. When, thereafter, the start switch ST is actuated to close its circuit, a start pulse having such a waveform as shown in FIG. 3A appears on the set terminal of the flip-flop circuit 10 so that the flip-flop circuit 10 inverts its state to produce "H" and "L" logic signals on its Q and $\overline{Q}$ output terminals respectively, as shown in FIGS. 3C and 3D. Thus, the NAND gate 14 produces an "H" logic signal which actuates the power switch 20 as shown in FIG. 3G. In this instance, the monostable multivibrator 12 maintains its stable state and continues to produce "L" and "H" logic signals on its output Q and $\overline{Q}$ terminals respectively. When the power switch 20 is actuated, at least one of the drive coils $W_1$ through $W_4$ is energized to apply torque to the magnetized rotor so that the rotor starts to rotate. Then, the drive coils $W_1$ through $W_4$ are energized in sequence so as to rotate the rotor in a normal direction. As shown in FIG. 3H, the rotational speed N of the rotor gradually increases and reaches a predetermined level $N_0$. FIG. 3J shows variations of the torque applied to the rotor.

When it is desired to stop the dc motor, the stop switch SP is actuated to close, so that a trigger pulse having such a waveform as shown in FIG. 3B is applied to the reset terminal of the flip-flop circuit 10 which then inverts its state so as to produce "H" and "L" logic signal on its $\overline{Q}$ and Q output terminals as seen from FIGS. 3C and 3D. At this moment, the monostable multivibrator 12 is triggered to produce "H" and "L" logic pulses having the same $t_m$ pulse width on its $\overline{Q}$ and Q output terminals as shown in FIGS. 3E and 3F. During appearance of these pulses, the bias current supply circuit 16 is triggered through its trigger terminal T so as to produce an inverted bias current from the output terminal B to the terminal A. Due to this inversion of the bias current, a reverse torque, "$-T_{max}$," is applied to the magnetized rotor as shown in FIG. 3J so that the rotational speed of the rotor quickly decreases during the time period $t_m$ as seen from FIG. 3H. Upon the lapse of the period $t_m$, the mono-stable multivibrator 12 returns to its stable state so as to produce "L" and "H" logic signals on its Q and $\overline{Q}$ output terminals with the result that the bias current is again inverted to flow from the terminal A to the terminal B and that the NAND gate 14 produces a "L" logic signal. Thus, the power switch 20 is turned "OFF" as seen from FIG. 3G so that no current flows through the drive coils $W_1$ through $W_4$. When torque applied to the magnetized rotor terminates the rotational speed of the rotor decreases gradually due to viscous friction etc. and the rotor stops rotating after the lapse of a time period of for example, $t_s$ as seen from FIG. 3H.

As will be apparent from the above description, time $t_m + t_s$ during which the rotor of the brushless dc motor stops is much shorter than the time period $t_l$ which is required to stop the dc motor without any reverse torque as in prior art control circuits. As seen from FIG. 3H, the time period $t_m + t_s$ may be about half of the time period $t_l$.

In this instance, it is to be noted that the time period $t_m$ is to be selected to satisfy the following formula:

$$t_m \leq (2\pi \cdot N_0 \cdot J_l)/(980 \times 60 \times Tm)$$

where,

Tm is maximum torque of the dc motor in g-cm;
$J_l$ is inertial mass of the rotor and a load to be connected to the motor in g-cm²/Rad;
$N_0$ is a rotational speed of the rotor and the load in RPM.
$2\pi$ being a conversion factor for revolutions to radians; 60 being a conversion factor for seconds to minutes; and, 980 being acceleration due to gravity in cm/sec².

The time period $t_m$ can be regulated by adjusting the resistance of the resistor VR of the monostable multivibrator 12.

It is now apparent from the above description that the control circuit according to the present invention can automatically apply a brake torque to the rotor of the brushless dc motor when the stop switch SP is actuated so that it can quickly stop the dc motor notwithstanding its simple and economical circuit arrangement.

It is to be noted that the switches ST and SP may be either mechanical or electrical switches. The power switch 20 may be also either mechanical or electrical. For example, a transistor switch including a Darlington amplifier may be used for the power switch 20.

Furthermore, the control circuit of the present invention may be applied to a brushless dc motor of multiphase type other than two-phase, if desired, even though the control circuit is combined with a two-phase brushless dc motor in the above example.

In the above-mentioned example, the dc motor rotates in only one direction. However, it is more desirable if the rotational direction of the rotor can be selected.

Figure 4:
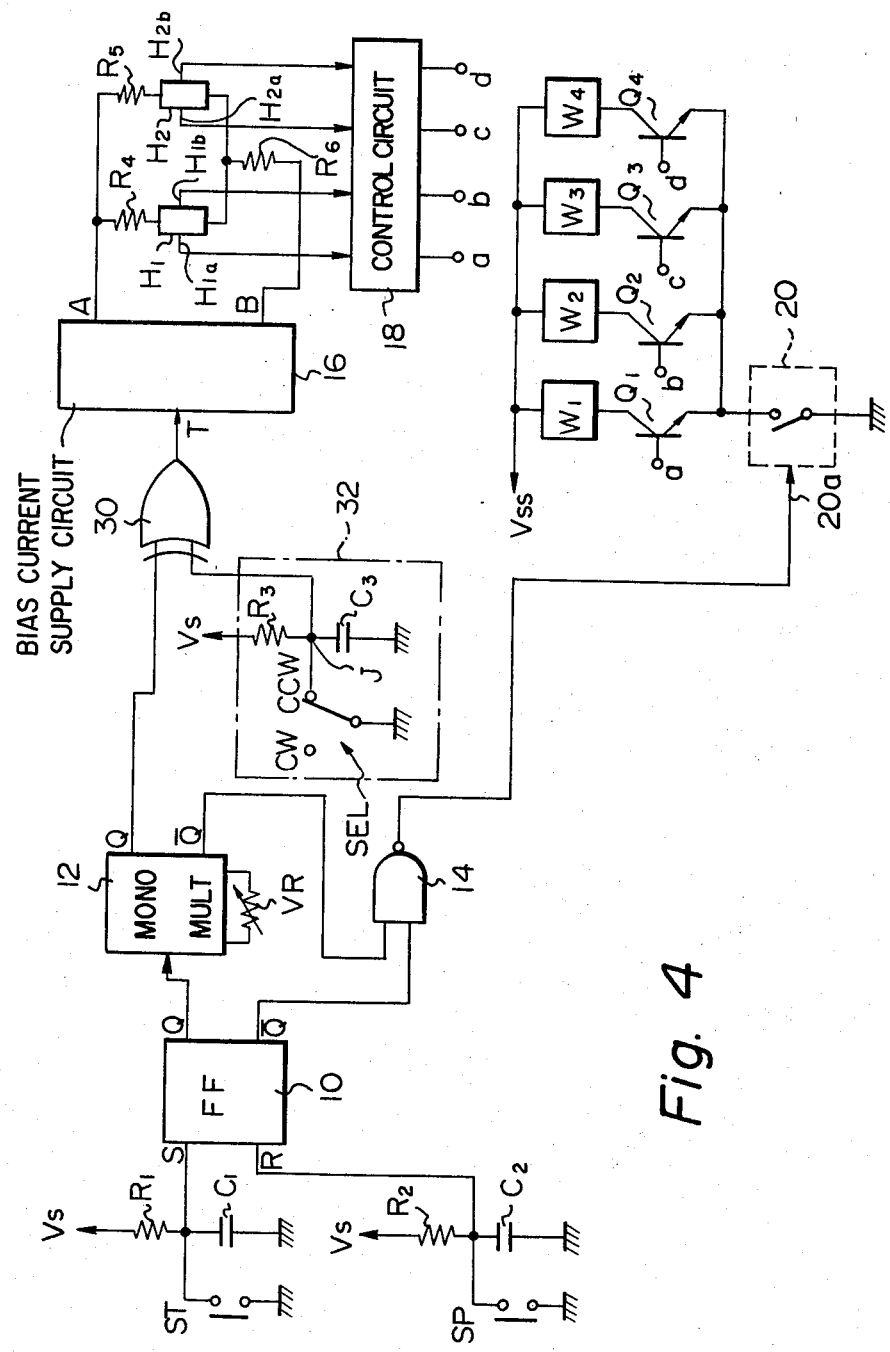
FIG. 4 is a circuit diagram showing another brushless dc motor control circuit according to the present invention.

FIG. 4 shows another control circuit according to the present invention in which the rotational direction of the rotor can be freely selected. This control circuit has the same construction as that of FIG. 1 except that it further comprises an exclusive OR circuit 30 which has one input terminal thereof connected to the output terminal Q of the monostable multivibrator 12 and an output terminal thereof connected to the trigger terminal T of the bias current supply circuit 16. The other input of the exclusive OR circuit 30 is connected to an output terminal of a select circuit 32. The select circuit includes a series connection of a resistor $R_3$ and a capacitor $C_3$ across which the source voltage $V_s$ is impressed. A junction J between the resistor $R_3$ and the capacitor $C_3$ is connected to the other input terminal of the exclusive OR circuit 30. A select switch SEL is provided having a movable contact which is grounded and a pair of stationary contacts CW and CCW. The stationary contact CCW is connected to the junction J so that the junction J is kept at ground potential when the movable contact is connected to the contact CCW. However, the potential at the junction J increases up to the source voltage $V_s$ when the movable contact disconnects from the contact CCW. In other words, the select circuit 32 produces on its output terminal an "L" logic signal when the movable contact is connected to the contact CCW but an "H" logic signal when the movable contact is connected to the contact CW. The exclusive OR circuit 30 operates to pass therethrough a logic signal from the monostable multivibrator 12 to the trigger terminal T of the bias current supply circuit 16 without any conversion when the output signal from the select circuit 32 is a logical "L". When, however, the output signal from the select circuit 32 is a logical "H" the exclusive OR circuit 30 operates to convert the logic signal from the monostable multivibrator 12 to an "L" signal and the logical "L" signal to a logical "H" signal.

The control circuit of FIG. 4 operates in the same manner as that of FIG. 1 except that the flow direction of the bias current supplied from the bias current supply circuit 16 is inverted by the operation of the select switch SEL of the select circuit 32. When, therefore, the start and stop switches ST and SP are actuated at the times shown in FIGS. 5A and 5B, the power switch 20 is actuated to close its circuit as shown in FIG. 5C. The monostable multivibrator 12 produces on its Q output terminal a pulse with a pulse width $t_m$ which is applied to one input terminal of the exclusive OR circuit 30. When the movable contact of the select switch SEL contacts with the contact CCW the exclusive OR circuit 30 produces the same signal as the input signal thereto as shown in FIG. 5E. When, however, the movable contact of the switch SEL contacts with the contact CW the exclusive OR circuit 30 produces a logic signal which is inverted from the input signal thereto, as shown in FIG. 5F. FIGS. 5G and 5H show variations in the rotational speed of the rotor and the torque applied to the rotor, respectively. Thus, the control circuit of FIG. 4 controls the dc motor in the same manner as that of FIG. 1 except that the control circuit of FIG. 4 changes the rotational direction of the motor in accordance with the actuation of the select switch SEL. In the following table there are shown relations between output and input signals of the exclusive OR circuit 30 and directions of bias current and the torque in the dc motor:

TABLE

| Mode of Operation | Input to Exclusive OR (30) | Output from Exclusive OR (30) | Bias Direction | Torque Direction |
| --- | --- | --- | --- | --- |
| Usual Reverse Operation | L | L | L | B → A | reverse |
| At Braking | H | L | H | A → B | normal |
| Usual Normal Operation | L | H | H | A → B | normal |
| At Braking | H | H | L | B → A | reverse |

Figure 6A:
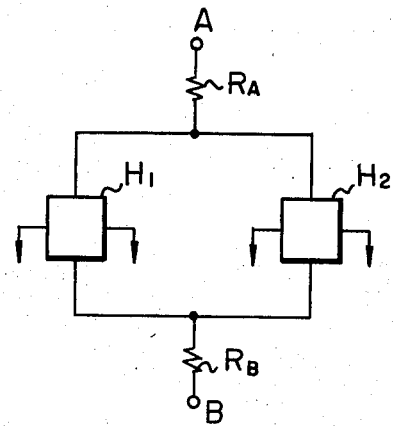
FIGS. 6A through 6D are circuit diagrams respectively showing modified connections around magneto-sensitive elements of the brushless dc motor.
Figure 6B:
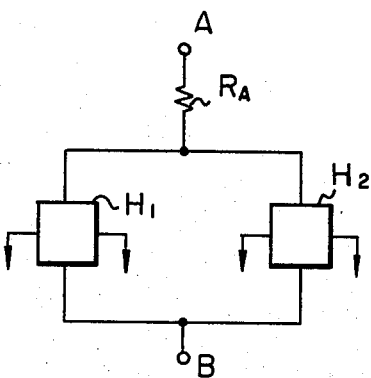
Figure 6C:
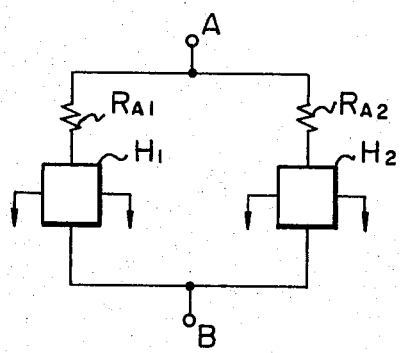
Figure 6D:
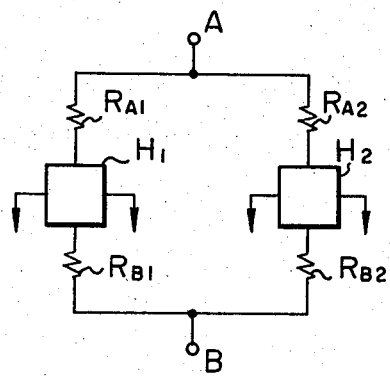

In FIGS. 6A through 6D, there are shown various connections of the Hall effect elements H₁ and H₂ between the bias current supply circuit 16 and the control circuit 1B. In an arrangement of FIG. 6A, the bias current is applied to the Hall effect elements H₁ and H₂ through a pair of resistors $R_A$ and $R_B$. In FIG. 6B, the bias current is applies to the Hall effect elements H₁ and H₂ through one resistor $R_A$. In FIG. 6C, a pair of resistors $R_{A1}$ and $R_{A2}$ are connected to the bias terminals of the Hall effect elements H₁ and H₂. In FIG. 6D, the bias terminals of the Hall effect elements H₁ are connected through resistors $R_{A1}$ and $R_{B1}$, to the terminal A and B respectively, and the bias terminals of the Hall effect element H₂ are connected through resistors $R_{A2}$ and $R_{B2}$ to the terminals A and B, respectively.

It will be understood that the invention is not to be limited to the exact constructions shown and described and that various changes and modifications may be made without departing from the spirit and scope of the invention as defined in the appended claims.

What is claimed is:

1. A brushless dc motor control circuit for driving and controlling a brushless dc motor including a magnetized rotor, a plurality of drive coils disposed in the vicinity of said magnetized rotor and a plurality of magneto-sensitive elements respectively having electrical characteristics responsive to changes in the magnetic field generated by said magnetized rotor, which comprises:

a bistable circuit having two stable states, said bistable circuit being adapted to assume one of said two stable states when triggered by a start indication signal and to assume the other state when triggered by a stop indication signal;

a pulse generator connected to said bistable circuit, for producing a braking pulse with a predetermined pulse width when said bistable circuit changes the state thereof from said one state to said other state;

a bias current supply circuit for supplying bias currents to said magneto-sensitive elements in a normal direction in the absence of said braking pulse and in a reverse direction in the presence of said braking pulse;

a drive signal generating circuit for producing a drive signal when said bistable circuit takes said one state or when said braking pulse is present; and, a power supply circuit for energizing said drive coils in a certain sequence in accordance with the change of the electrical characteristics of the respective magneto-sensitive elements, when said drive signal is received, whereby said magnetized rotor rotates.

2. A brushless dc motor control circuit as set forth in claim 1, in which said bistable circuit includes:

an R-S flip-flop circuit;

a first charging circuit having a first capacitor to be charged by a voltage source and a normally-open start switch adapted to close its circuit to bypass said first capacitor when triggered by said start indication signal, a reduction in voltage across said first capacitor causing said R-S flip-flop circuit to be set; and, a second charging circuit having a second capacitor to be charged by a voltage source and a normally-open switch adapted to close its circuit to bypass said second capacitor when triggered by said stop indication signal, a reduction in voltage across said second capacitor causing said R-S flip-flop circuit to be reset.

3. A brushless dc motor control circuit as set forth in claim 2, in which said pulse generator includes a monostable multivibrator which has a trigger terminal connected to a Q terminal of said R-S flip-flop circuit.

4. A brushless dc motor control circuit as set forth in claim 1, in which said bias current supply circuit includes:

first and second switching elements each having a gate terminal through which it is triggered to become conductive:

a control circuit connected to the gate terminals of said first and second switching elements, for selectively triggering said first and second switching elements in response to said rotational direction indication signal;

a third switching element serially connected to said first switching element and having a gate terminal through which it is triggered to become conductive, said gate terminal being connected to said second switching element so that said third switching element becomes conductive when said second switching element becomes conductive;

a fourth switching element serially connected to said second switching element and having a gate terminal through which it is triggered to become conductive, said gate terminal being connected to said first switching element so that said fourth switching element becomes conductive when said first switching element becomes conductive; and a voltage supply means for supplying a predetermined voltage to the respective series connections of said first and third switching element and of said second and fourth switching elements.

5. A brushless dc motor control circuit as set forth in claim 4, in which said first through fourth switching elements are respectively transistors each having a base terminal made active as the gate terminal.

6. A brushless dc motor control circuit as set forth in claim 1, which further comprises:

a polarity changing circuit connected to said pulse generator, for changing the polarity of the output signal from said pulse generator in accordance with a rotational direction indication applied thereto.

7. A brushless dc motor control circuit as set forth in claim 6, in which said polarity changing circuit includes:

an exclusive OR circuit having one input terminal thereof connected to the output terminal of said pulse generator; and, rotational direction indication means connected to the other input terminal of said exclusive OR circuit, for applying to said the other input terminal of said exclusive OR circuit a logical "1" or "0" signal in accordance with said rotational direction indication.

8. A brushless dc motor control circuit as set forth in claim 7, in which said rotational direction indication means includes:

a charging circuit having a series connection of a resistor and a capacitor and means to impress a voltage across said series connection the, intermediate point between said resistor and said capacitor being connected to said other input terminal of said exclusive OR circuit; and an ON-OFF switch selectively bypassing said capacitor in accordance with said rotational direction indication.

9. A brushless dc motor control circuit for driving and controlling a brushless dc motor including:

a magnetized rotor;

a plurality of drive coils disposed in the vicinity of said magnetized rotor and a plurality of magneto-sensitive elements respectively having electrical characteristics responsive to changes in the magnetic field generated by said magnetized rotor;

a power supply circuit for energizing said drive coils in a certain sequence in accordance with the changes of the electrical characteristics of said magneto-sensitive elements;

and a bias current supply circuit for supplying bias current to said magneto-sensitive elements in either direction in response to a rotational direction indication signal, said bias current supply circuit including:

first and second switching elements each having a gate terminal through which it is triggered to become conductive;

a control circuit connected to the gate terminals of said first and second switching elements, for selectively triggering said first and second switching elements in response to said rotational direction indication signal;

a third switching element serially connected to said first switching element and having a gate terminal through which it is triggered to become conductive, said gate terminal being connected to said second switching element so that said third switching element becomes conductive when said second switching element becomes conductive;

a fourth switching element serially connected to said second switching element and having a gate terminal through which it is triggered to become conductive, said gate terminal being connected to said first switching element so that said fourth switching element becomes conductive when said first switching element becomes conductive; and, a voltage supply means for supplying a predetermined voltage to the respective series connections of said first and third switching elements and of said second and fourth switching elements.

10. A brushless dc motor control circuit as set forth in claim 8, in which said first through fourth switching elements are respectively transistors each having a base terminal made active as the gate terminal.

* * * * *